United States Patent
Law et al.

(10) Patent No.: US 11,733,594 B2
(45) Date of Patent: Aug. 22, 2023

(54) CAMERA AND MOUNT

(71) Applicant: Dell Products L.P., Round Rock, TX (US)

(72) Inventors: Celia Law, Singapore (SG); Chun Long Goh, Singapore (SG); Peng Lip Goh, Singapore (SG); Deeder M. Aurongzeb, Austin, TX (US); Wai Mun Lee, Singapore (SG)

(73) Assignee: Dell Products L.P., Round Rock, TX (US)

( * ) Notice: Subject to any disclaimer, the term of this patent is extended or adjusted under 35 U.S.C. 154(b) by 64 days.

(21) Appl. No.: 17/325,503

(22) Filed: May 20, 2021

(65) Prior Publication Data

US 2022/0373871 A1    Nov. 24, 2022

(51) Int. Cl.
| | |
|---|---|
| G03B 17/56 | (2021.01) |
| H04N 7/18 | (2006.01) |
| G03B 11/04 | (2021.01) |
| F16M 13/04 | (2006.01) |
| H04N 23/51 | (2023.01) |

(52) U.S. Cl.
CPC ........... *G03B 17/561* (2013.01); *F16M 13/04* (2013.01); *G03B 11/041* (2013.01); *H04N 7/18* (2013.01); *H04N 23/51* (2023.01)

(58) Field of Classification Search
None
See application file for complete search history.

(56) References Cited

U.S. PATENT DOCUMENTS

| | | | |
|---|---|---|---|
| 5,811,790 A | 9/1998 | Endo et al. | |
| 6,375,369 B1 | 4/2002 | Schneider et al. | |
| D510,589 S * | 10/2005 | Andre | D16/202 |
| 7,163,181 B2 | 1/2007 | Omps | |
| 7,337,497 B2 | 3/2008 | Seidler et al. | |

(Continued)

FOREIGN PATENT DOCUMENTS

| | | |
|---|---|---|
| CN | 204217039 U | 3/2015 |
| WO | 2011087301 A1 | 7/2011 |

OTHER PUBLICATIONS

Jellycomb W15 webcam downloaded from https://cdn.shopity.com/s/files/1/0053/8263/5610/files/WGBG-015_W15.pdf?v=1618477508 on May 2, 2022, as listed by Examiner in an 892 in a Non-Final Office action dated Apr. 21, 2022 in related U.S. Appl. No. 17/325,501.

(Continued)

*Primary Examiner* — Rodney E Fuller
(74) *Attorney, Agent, or Firm* — Zagorin Cave LLP; Robert W. Holland

(57) ABSTRACT

A camera built into a cylindrical housing couples to a stand with a stand member that inserts into an opening having a magnet attracted to ferromagnetic material integrated in the stand member. The stand member may couple to a bracket that holds the camera at a display or to a tripod that places the camera between the display and an end user participating in a video conference. A lens cover couples over a front face of the camera with magnetic attraction and is stored at a rear face of the camera with magnetic attraction. In various embodiments, sensors detect lens cap and/or stand member position to control camera power and/or camera visual image capture operations.

17 Claims, 14 Drawing Sheets

(56) References Cited

U.S. PATENT DOCUMENTS

| | | | |
|---|---|---|---|
| 7,612,825 B2 | 11/2009 | Silverbrook | |
| D618,266 S | 6/2010 | Imaeda | |
| 8,824,166 B2 | 9/2014 | Rohrbach | |
| 9,169,962 B2* | 10/2015 | Wang | F16M 11/14 |
| D761,340 S | 7/2016 | Pacurariu et al. | |
| D761,343 S | 7/2016 | Schmidt et al. | |
| 9,611,978 B2 | 4/2017 | Manniche et al. | |
| 9,631,767 B2 | 4/2017 | Kilgore et al. | |
| 10,502,247 B2 | 12/2019 | Bury | |
| 10,520,127 B2* | 12/2019 | Dearsley | G03B 17/561 |
| 10,724,681 B2* | 7/2020 | Gearing | F16M 13/08 |
| 10,831,093 B1 | 11/2020 | Lablans | |
| 2004/0257432 A1* | 12/2004 | Girish | H04N 7/142 |
| | | | 348/E7.083 |
| 2007/0046031 A1 | 3/2007 | Goldenberg et al. | |
| 2009/0101768 A1 | 4/2009 | Wert | |
| 2010/0021155 A1* | 1/2010 | Orzeck | G03B 17/00 |
| | | | 396/428 |
| 2010/0237206 A1* | 9/2010 | Barker | F16M 13/08 |
| | | | 248/206.5 |
| 2013/0163197 A1 | 6/2013 | Mack et al. | |
| 2015/0201530 A1 | 7/2015 | Liu et al. | |
| 2017/0315596 A1 | 11/2017 | Torres et al. | |
| 2018/0020193 A1 | 1/2018 | Blum et al. | |
| 2020/0183255 A1* | 6/2020 | Gwalani | G02B 7/022 |
| 2020/0296272 A1 | 9/2020 | Kramarov | |
| 2020/0392759 A1* | 12/2020 | Morrison | G06F 1/1607 |

OTHER PUBLICATIONS

Pocketlint, "Review of V5 camera," at https://www.pocket-ling.com/laptops/reviews/71475-liquid-digital-solutions-agent-v5-webcam dated Nov. 3, 2009 (Year 2009).

Goodgearguide "Goodgearguide.com.au review of V5 camera," at https://www.goodgearguide.com.au/review/liquid_digital_solutoins/agent_v5/317033, dated Feb. 9, 2009 (Year 2009).

Logitech, "Setting Up & Using a Logitech Meetup," https://support.apu.edu/hc/en-us/articles/360011828914-Setting-Up-Using-a-Logitech-MeetUp dated Feb. 10, 2020 (Year 2020).

Minimally Minimal, "Apple iSight," at http://www.minimallyminimal.com/blog/apple-isight, Mar. 9, 2014, downloaded Apr. 5, 2022, 27 pages.

Wikipedia, "iSight," downloaded from http://en.wikipedia.org/wiki/ISight on May 20, 2021, 4 pages.

* cited by examiner

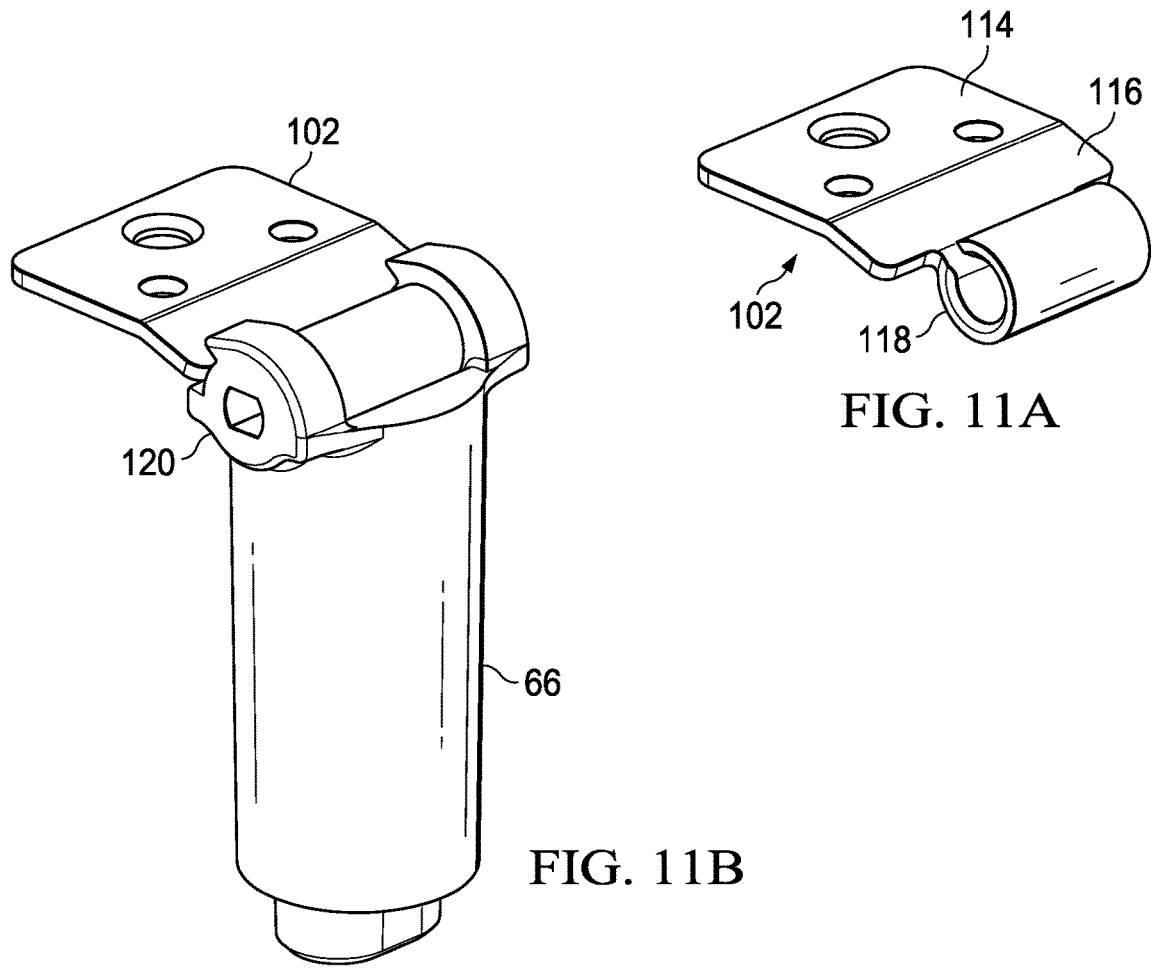
FIG. 11A
FIG. 11B
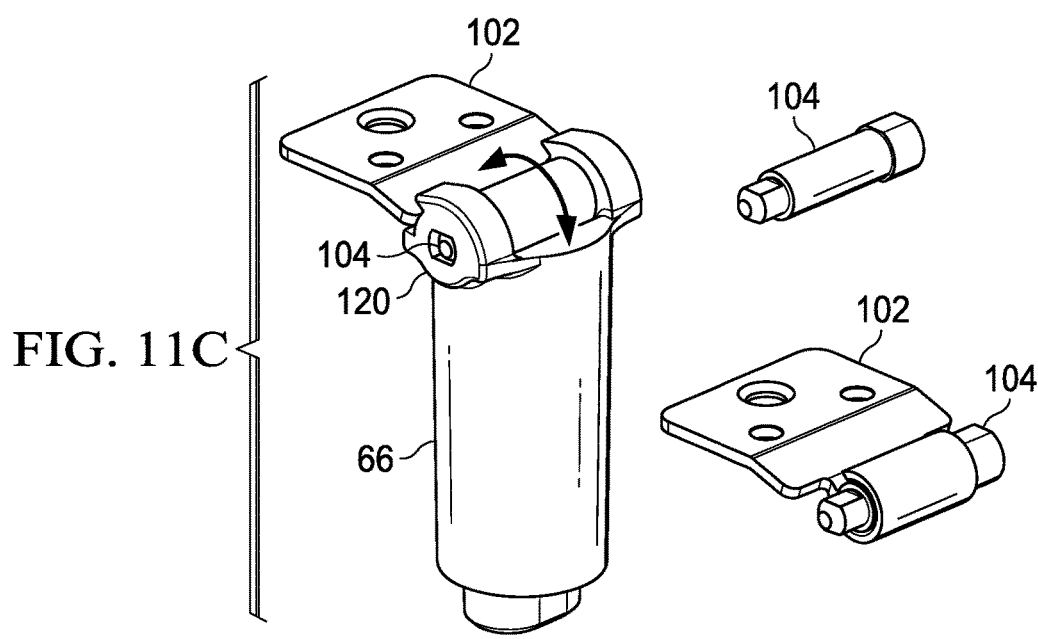
FIG. 11C

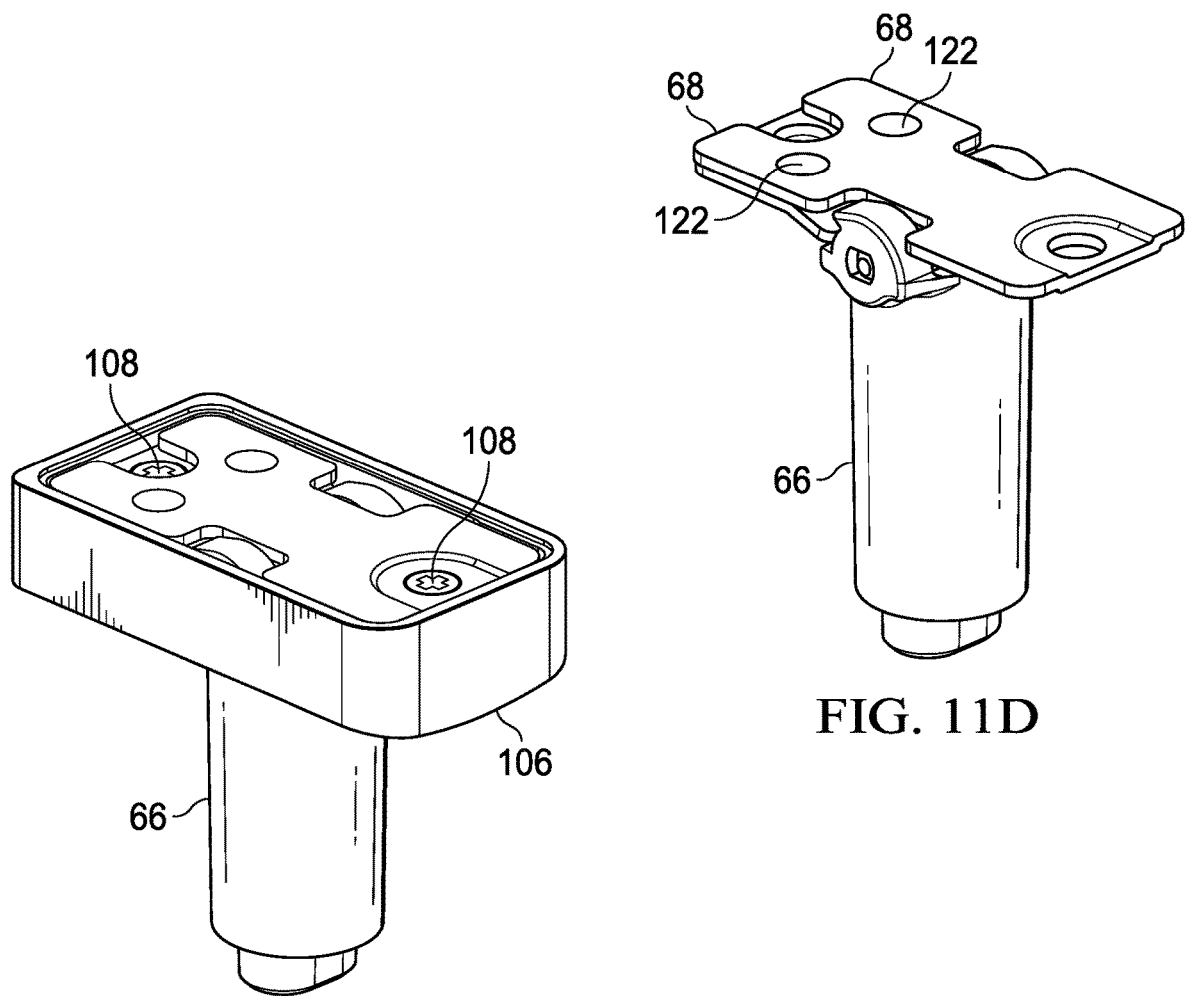
FIG. 11D
FIG. 11E
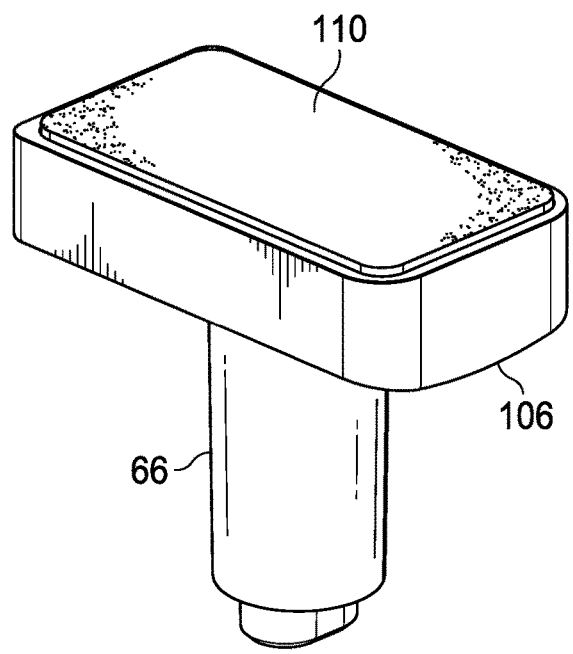
FIG. 11F

CAMERA AND MOUNT

CROSS REFERENCE TO RELATED APPLICATIONS

U.S. patent application Ser. No. 17/325,494, filed May 20, 2021, entitled "Camera Stand with Integrated Tilt Hinge" by inventors Peng Lip Goh, Celia Law, and Deeder M. Aurongzeb, describes exemplary methods and systems and is incorporated by reference in its entirety.

U.S. patent application Ser. No. 17/325,501, filed May 20, 2021, entitled "Camera and Lens Cap" by inventors Celia Law, Chun Long Goh, Peng Lip Goh, Deeder M. Aurongzeb, and Wai Mun Lee describes exemplary methods and systems and is incorporated by reference in its entirety.

U.S. patent application Ser. No. 17/325,508, filed May 20, 2021, entitled "Cylindrical Camera Thermal Shield" by inventors Peng Lip Goh, Celia Law, and Deeder M. Aurongzeb, describes exemplary methods and systems and is incorporated by reference in its entirety.

U.S. patent application Ser. No. 17/325,518, filed May 20, 2021, entitled "Cylindrical Camera and Integrated Support" by inventors Peng Lip Goh, Celia Law, and Deeder M. Aurongzeb, describes exemplary methods and systems and is incorporated by reference in its entirety.

BACKGROUND OF THE INVENTION

Field of the Invention

The present invention relates in general to the field of information handling system peripheral devices, and more particularly to an information handling system camera and mount.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often interact with peripheral devices, such keyboards, mice and cameras. Cameras are typically used to support videoconferences in which visual images captured by cameras are exchanged so that end users can communicate while viewing each other. Typically, videoconferences are performed with cameras that have relatively low resolution. The use of low resolution is driven in part by the amount of bandwidth consumed by communication of video information. In addition, low resolution is driven by the footprint of typical Web cameras, which generally do not have the size to support high quality lenses. For example, cameras integrated in portable information handling systems tend to have a restricted focal length due to the thickness of typical portable information handling system housings. Peripheral Web cameras typically have a larger footprint so that higher quality lenses may be included that capture higher resolution visual images than integrated cameras. Generally, even with larger housing footprints, Web cameras tend to limit resolution to High Definition visual images as Ultra High Definition or 4K cameras have large bandwidth demands.

Recently, enterprises have experienced an increased reliance on videoconferences to interact internally between employees and externally with customers and vendors. Although lower resolution Web cameras are sufficient for many daily uses, in many situations, higher quality video images are desired. For instance, in conferences that involve senior executives or high government officials, higher resolution video images are generally desired. Often, such high level conferences are done from large conferences rooms and involve a number of participants. Generally, high resolution cameras with high quality lenses offer a number of advantages in such scenarios. One advantage is that greater focal length will allow one camera to provide high quality video images at different ranges through zoom functionality. Another advantage is that higher resolution offers greater flexibility for digital zoom, pan and tilt functions, such as by cropping an image to capture a participant with a close-up view. Some videoconference participants have resorted to professional DSLR or equivalent cameras set up as peripheral devices to improve the video conference experience. One difficulty with the use of such specialized and expensive equipment is that setting up a videoconference and using the equipment tends to take a good deal of expertise and extra time compared with conventional Web cameras.

In addition to increased complexity and setup time, another difficulty that can arise with attempts to use high end camera equipment for videoconferences is the security of the video conference. Typically, more expensive camera lenses come with lens covers designed to protect against scratches or other damage to the lenses. However, when used as a Web camera that interfaces with an information handling system, another important consideration is security at the camera so that an unauthorized user does not obtain access to visual images at a location. In many integrated cameras and lower resolution cameras, a shutter is included that slides across the camera lens to prevent unauthorized capture of visual images. Integrated shutters generally are not common in high end cameras due to the larger and more expensive lens structures. Separate lens covers tend to get lost or misplaced and increase the hassle factor of using a high end camera.

Another difficulty that can arise with attempts to use high end camera equipment is that very important video conferences involving enterprise executives and high government officials will often involve multiple speakers at multiple locations. In such situations, technicians may have to relocate cameras around a conference room to accommodate different speakers. Peripheral cameras tend to have a variety of different types of brackets and stands that are not compatible across different vendors or even for a vendor with different camera models. Often, brackets and stands couple to a peripheral camera with a threaded member that couples to threads disposed in an opening of the camera. Even after a peripheral camera is removed from a bracket and coupled to another bracket, the orientation and focus of the camera typically has to be adjusted to capture a desired field of view. Conventional peripheral camera brackets and stands are often time consuming to move and adjust so that technicians have difficulty doing so in a timely manner during an active video conference. Moreover, the technicians can become a distraction to an ongoing video conference as they adjust camera positions and fields of view. In addition, brackets and stands for holding cameras tend to include unsightly hinges for manipulation of camera tilt and pan that detract from a professional appearance generally expected at top level conferences.

SUMMARY OF THE INVENTION

Therefore, a need has arisen for a system and method which couples a camera lens cap and/or stand to a camera with magnetic attraction.

In accordance with the present invention, a system and method are provided which substantially reduce the disadvantages and problems associated with previous methods and systems for coupling a lens cap and/or stand to a camera. A camera integrates a magnet in an opening of a bottom surface that accepts a stand member having a ferromagnetic material so that magnetic attraction couples the camera to the stand, such as bracket for coupling to a display and/or a tripod. A lens cap couples to a front face of the camera over a lens by magnetic attraction of one or more magnets integrated in the camera front face and ferromagnetic material integrated in the lens cap.

More specifically, an information handling system processes information with a processor and memory and presents the information as visual images at a peripheral display. For example, the processor executes a videoconferencing application that accepts visual images captured at a peripheral camera for communication through a network. The peripheral camera includes a lens and sensor disposed in a cylindrical housing that directs light to a light sensor for conversion to visual images, such as an Ultra High Definition 4K visual image. The camera cylindrical housing couples to a stand with a magnet disposed in an opening at the bottom surface and ferromagnetic material, such as steel, integrated in a stand member that inserts into the opening. The stand member couples to a bracket that clips over a top surface of the peripheral display and also couples to a tripod that rests on a desktop surface between the peripheral display and an end user participating in the videoconference. Magnets disposed at a front and rear face of the cylindrical housing couple to a lens cap having an integrated ferromagnetic material, such as a steel plate. The lens cap protects the lens when coupled over the front face and provides security against unauthorized video image capture. During use of the camera, the lens cap is removed and magnetically coupled to the rear face for storage. In one example embodiment, sensors disposed in the camera detect the lens cap to manage power at the camera. In another example embodiment, electropermanent magnets are used that have on and off magnetic attraction states to aid in removing the lens cap and stand and to aid in more stable coupling by applying magnetic attraction when placement of the stand member and/or lens cap is detected in proximity to ferromagnetic material.

The present invention provides a number of important technical advantages. One example of an important technical advantage is that a cylindrical camera housing configured to hold high a quality lens and UHD sensor is securely coupled to a stand with magnetic attraction. The stand extends a stand member into an opening at the bottom of the cylindrical housing and holds the stand member in place with magnetic attraction to allow rapid and simple selection of different types of stands, such as display bracket or a tripod. Another example of an advantage is that a lens cap fits over a lens of the camera through magnetic attraction, such as with a magnet disposed at the camera front face and a ferromagnetic plate integrated in the lens cap. The degree of magnetic attraction may be adjusted, such as by changing the magnetic state of an electropermanent magnet, to provide more gradual coupling and release of the stand member and lens cap. Camera security may be enhanced by tying power application at the camera to sense presence of the lens cap at the front face. In one embodiment, a logo on the lens cap couples with an upright orientation based upon magnetic pole orientation of magnets in the lens cap and the camera. In another embodiment, a camera tilt hinge is integrated in stand to provide tilt functionality with the tilt hinge out of sight.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIGS. 11A, 11B, 11C, 11D, 11E and 11F depict assembly of an example stand member that integrates a tilt hinge.

DETAILED DESCRIPTION

A camera in a cylindrical shaped housing interfaces with an information handling system to support videoconferencing and couples a bracket, a tripod and/or a lens cap with magnetic attraction. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
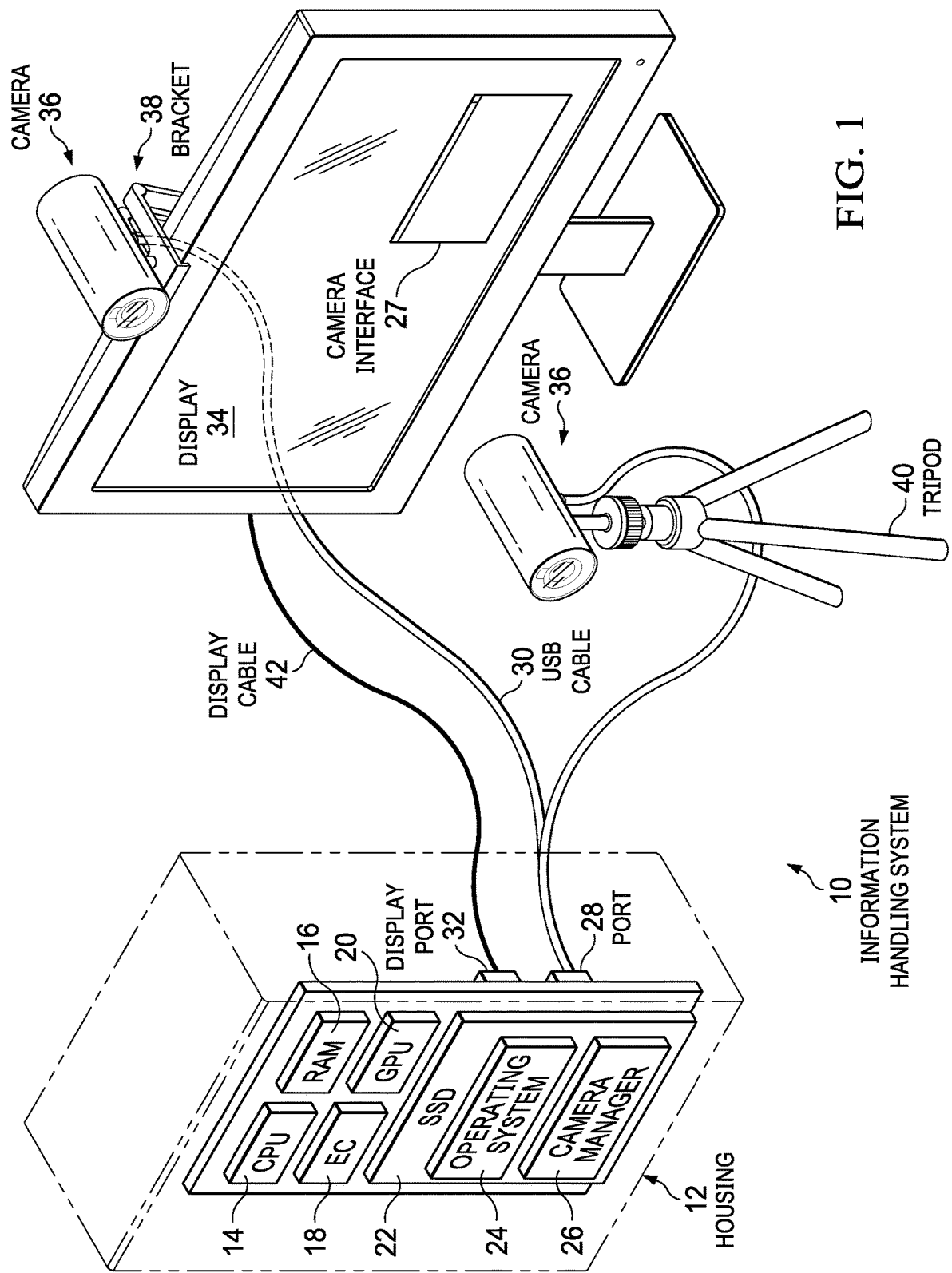
FIG. 1 depicts a block diagram of an information handling system interfaced with a peripheral camera that supports videoconferencing.

Referring now to FIG. 1, a block diagram depicts an information handling system 10 interfaced with a peripheral camera 36 that supports videoconferencing. In the example embodiment, information handling system 10 processes information with processing components disposed in a housing 12. For example, a central processing unit (CPU) 14 executes instructions that process information with the instructions and information stored in a random access memory (RAM) 16. An embedded controller 18 manages physical operating conditions within housing 12, such as application of power and maintaining thermal constraints, and also manages interactions with peripheral devices, such as a keyboard and mouse. A graphics processing unit (GPU) 20 interfaces with CPU 14 and further processes the information to generate visual images, such as by generating pixel values that define pixel colors for presentation at display 34. A solid state drive (SSD) 22 provides non-transitory memory, such as flash, that stores information during system power down states. For example, the instructions may include an operating system 24 stored in SSD 22 and retrieved to RAM 16 with boot code executed on embedded controller 18 at system power up.

GPU 20 interfaces through a display port 32 and display cable 42 with a display 34 that presents information as visual images, such as by scanning pixel values to a display panel having rows and columns of pixels. In the example embodiment, a first peripheral camera 36 is illustrated in two different positions relative to display 34. A bracket 38 couples camera 36 to an upper side of display 34 to capture visual images of an end user viewing display 34. A second peripheral camera 36 rests on a tripod 40 to capture visual images of an end user viewing the display from a location in between the end user and the display. Multiple viewing locations for camera 36 provides an end user with increased flexibility regarding the quality of a visual image captured by camera 34. As is described below in greater detail, camera 36 may selectively detach and attach from each of bracket 38 and tripod 40. Camera 36 captures visual images and communicates the visual images through a USB cable 30 and to a USB port 28 for use by information handling system 10, such as to support a videoconference. In the example embodiment, a camera manager 26, such as driver of operating system 24, provides a camera interface 27 for presentation at display 34 to manage camera settings and present visual images captured by camera 36.

Figure 2:
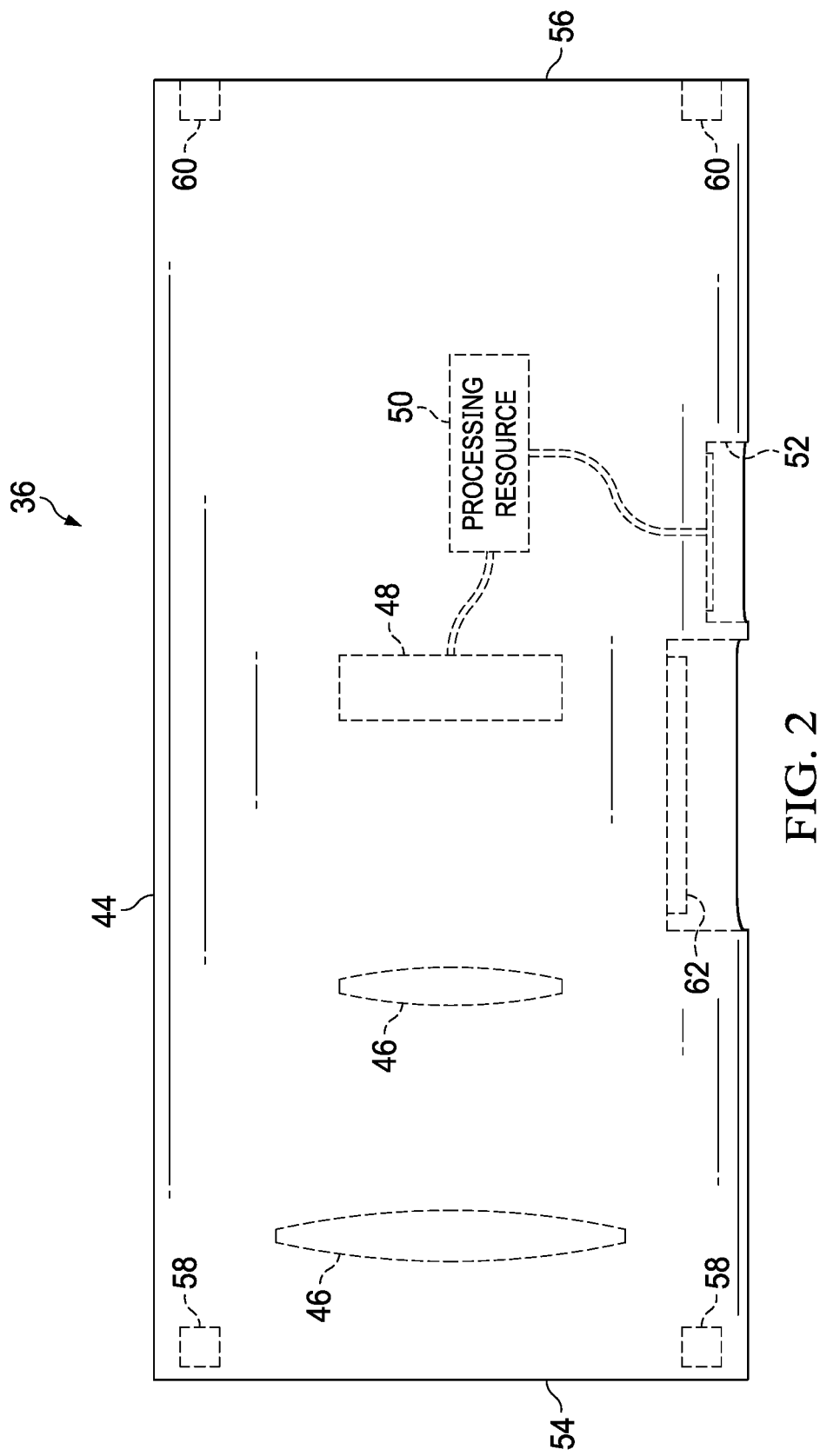
FIG. 2 depicts a side cutaway view of the camera configured to couple to a stand and lens cap with integrated magnets.

Referring now to FIG. 2, a side cutaway view depicts camera 36 configured to couple to a stand and lens cap with integrated magnets. In the example embodiment, camera 36 houses lenses 46 in a cylindrical housing 44 to capture visual images with a light sensor 48. A processing resource 50, such as a microcontroller, interfaces with light sensor 48 to communicate captured visual images out of camera 36 through a USB port 52 integrated in an opening at a bottom side of cylindrical housing 44. A lens cover glass 54 at a front face of cylindrical housing 44 protects lens 46 from contaminants while providing a transparent material through which light passes for capture through lens 46 at light sensor 48. In the example embodiment, a pair of lens cap magnets 58 are disposed proximate lens glass cover 54 to attract ferromagnetic material integrated in a lens cap so that the lens cap covers lens cover glass 54. At a rear face 56 of cylindrical housing 44, lens cap storage magnets 60 are disposed to attract the lens cap as a place of storage when camera 36 is active capturing visual images. Proximate USB port 52, an opening in cylindrical housing 44 integrates a stand magnet 62 that uses magnetic attraction to couple to a stand of bracket 38 or tripod 40, as set forth in greater detail below. The cylindrical shape of the housing, including its length, provides an efficient layout for optical image capture so that a UHD 4K light sensor can be used to capture high quality visual images.

Figure 3A:
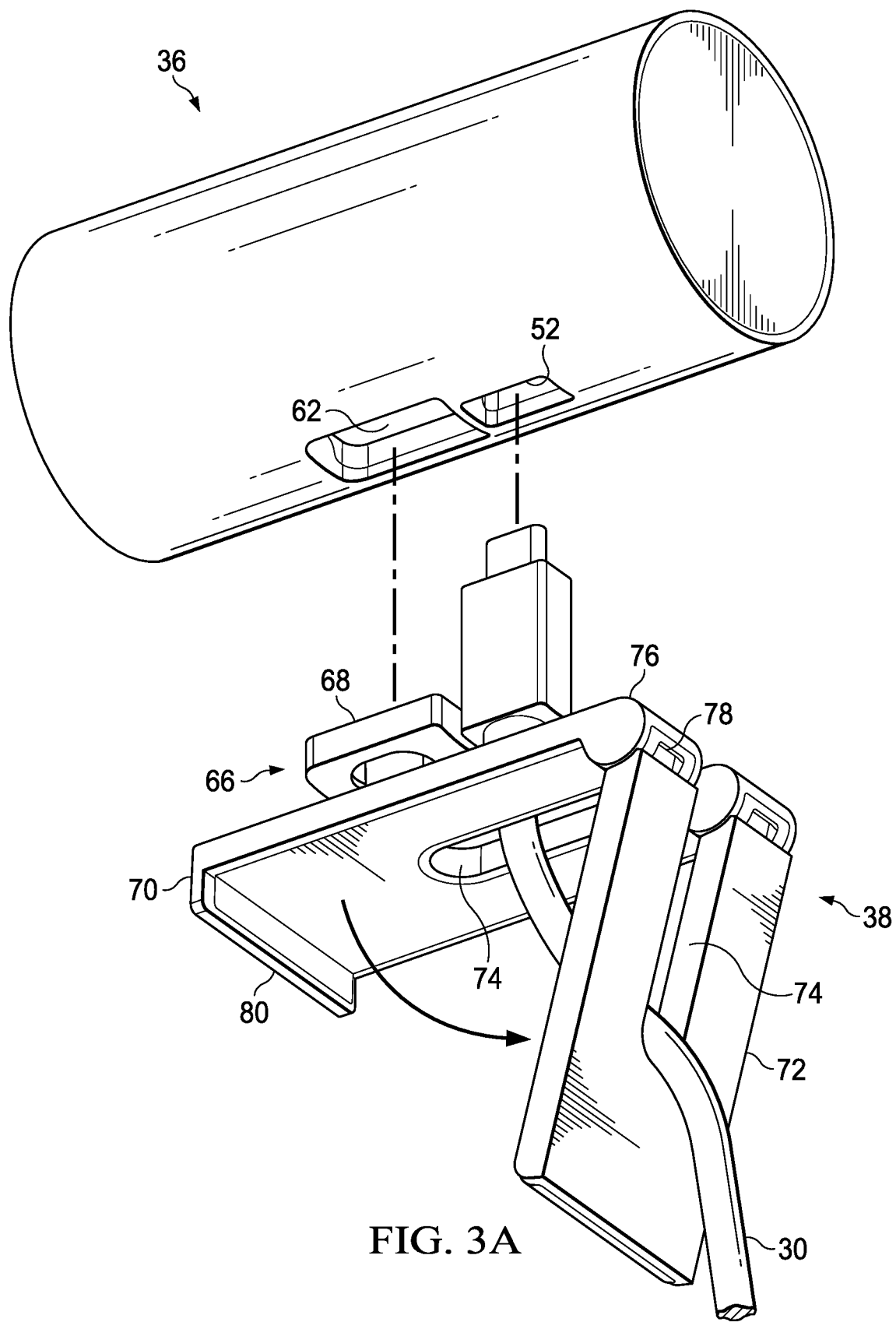
FIGS. 3A and 3B depict a camera coupled to a bracket that holds the camera at a display top side surface.
Figure 3B:
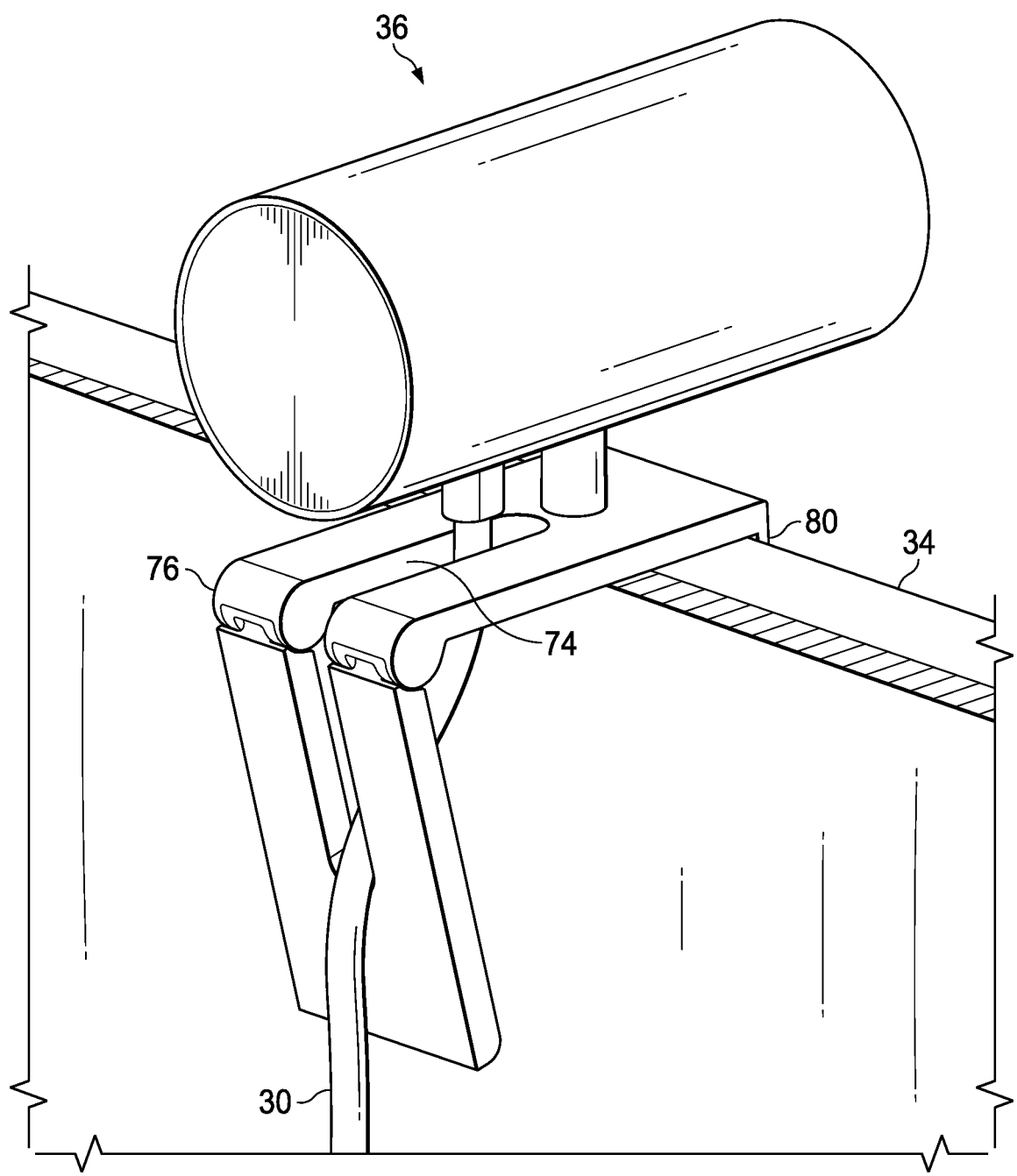

Referring now to FIGS. 3A and 3B, camera 36 is depicted coupled to a bracket that holds the camera at a display top side surface. FIG. 3A depicts a bottom perspective view of camera 36 exploded away from bracket 38. USB port 52 has a USB cable 30 aligned for insertion after passing through slots 74, which help to guide cable 30 for cable management. A stand member 66 sized to insert into the opening at stand magnet 62 integrates a ferromagnetic material 68 that attracts to stand magnet 62 to hold stand member 66 in place. Bracket 38 includes an upper bracket portion 70 coupled to stand member 66 and a lower bracket portion 72 coupled to upper bracket portion 70 by a hinge 76 biased towards a planar disposition by a hinge spring 78. Upper bracket portion 70 has a lip 80 that fits over a front edge of a display 34, as illustrated by FIG. 3B, to hold bracket 38 in position at the upper surface of display 34. Hinge spring 78 biases lower bracket portion 72 against the rear surface of display 34 to hold camera 36 in position. In alternative embodiments, stand member 66 may have a magnet that attracts to ferromagnetic material disposed in the opening of camera 36, or magnets of opposing polar orientations may be used in both stand member 66 and the opening of camera 36.

Figure 4A:
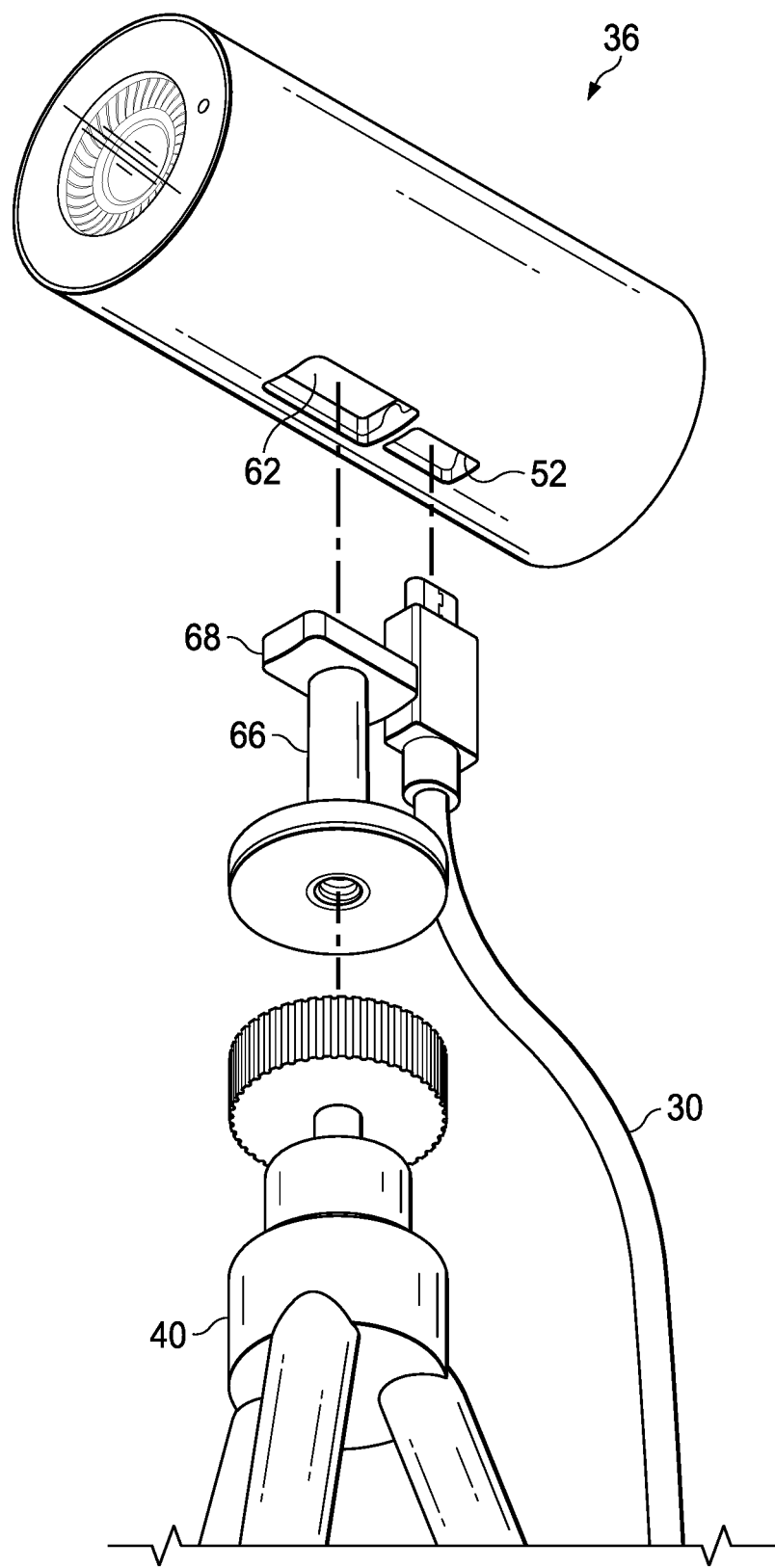
FIGS. 4A and 4B depict a camera coupled to a tripod support that holds the camera on a desktop surface, such as between an end user and a display presenting a videoconference in which the end user participates.
Figure 4B:
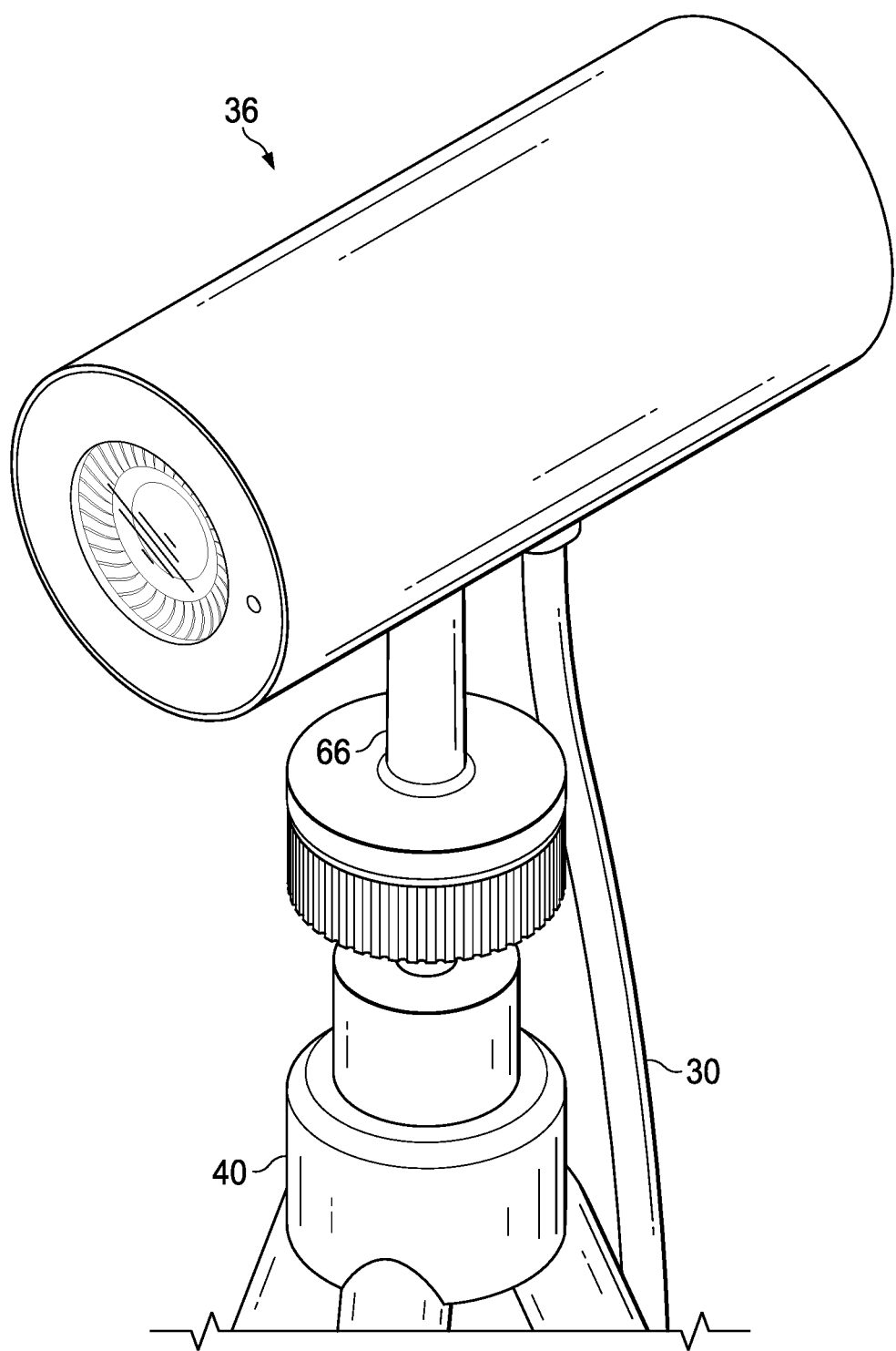

Referring now to FIGS. 4A and 4B, camera 36 is depicted coupled to a tripod 40 support that holds the camera on a desktop surface, such as between an end user and a display presenting a videoconference in which the end user participates. FIG. 4A depicts a bottom perspective view of camera 36 exploded away from tripod 40. USB port 52 has a USB cable 30 aligned for insertion and to offset from tripod 40 to allow rotation about tripod 40 without interference by cable 30. A stand member 66 sized to insert into the opening at stand magnet 62 integrates a ferromagnetic material 68 that attracts stand magnet 62 to hold stand member 66 in place. In various embodiments, stand member 66 may be specific to coupling at tripod 40, as depicted by FIG. 4B, or may interchangeably couple to bracket 38 and tripod 40. In the example embodiment, the flat bottom surface of stand 66 provides some support to hold camera 36 on a support surface if needed, although coupling at the tripod 40 firmly secures camera 36 with manual pan and tilt capability.

Figure 5:
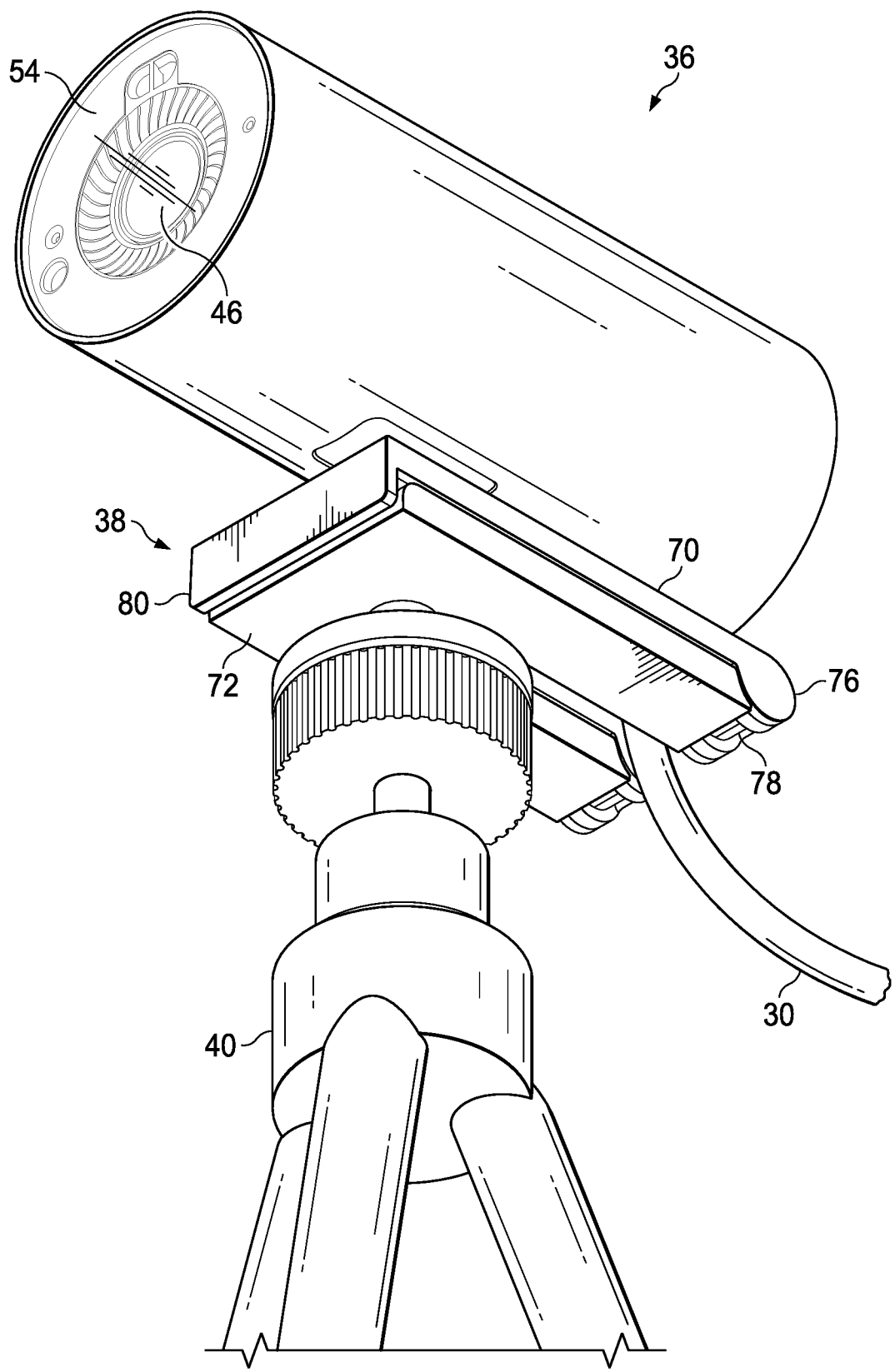
FIG. 5 depicts an example embodiment of a bracket and tripod cooperatively coupling to support a camera.

Referring now to FIG. 5, an example embodiment depicts a bracket and tripod cooperatively coupling to support a camera. A bracket 38 couples by magnetic attraction to camera 36 as described above. Lower bracket portion 72 has a length of slightly less than upper bracket portion 70 so that hinge 76 and hinge spring 78 bias lower bracket portion 72 to a closed planar configuration within the space defined by lip 80 at the bottom side of upper bracket portion 70. In this closed planar configuration, the bottom surface of bracket 38 offers a stand that can hold camera 36 with lens 46 raised to capture visual images through lens cover glass 54. As is illustrated, tripod 40 may also couple to bracket 38 rather than directly to the stand member inserted in the opening of camera 36. An advantage of this configuration is that camera 36 may quickly be transferred between positions coupled to the display or to the tripod.

Figure 6A:
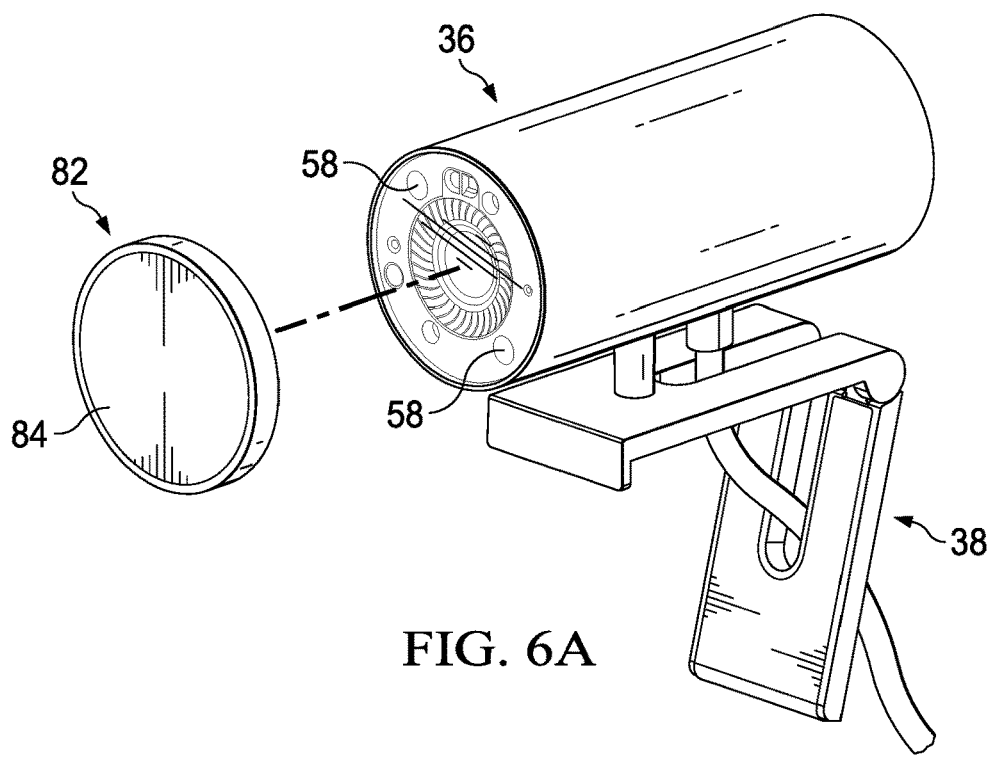
FIGS. 6A and 6B depict a lens cap coupled to a front face of the camera to protect the lens cover glass and to the rear face of the camera for storage when the camera is in use.
Figure 6B:
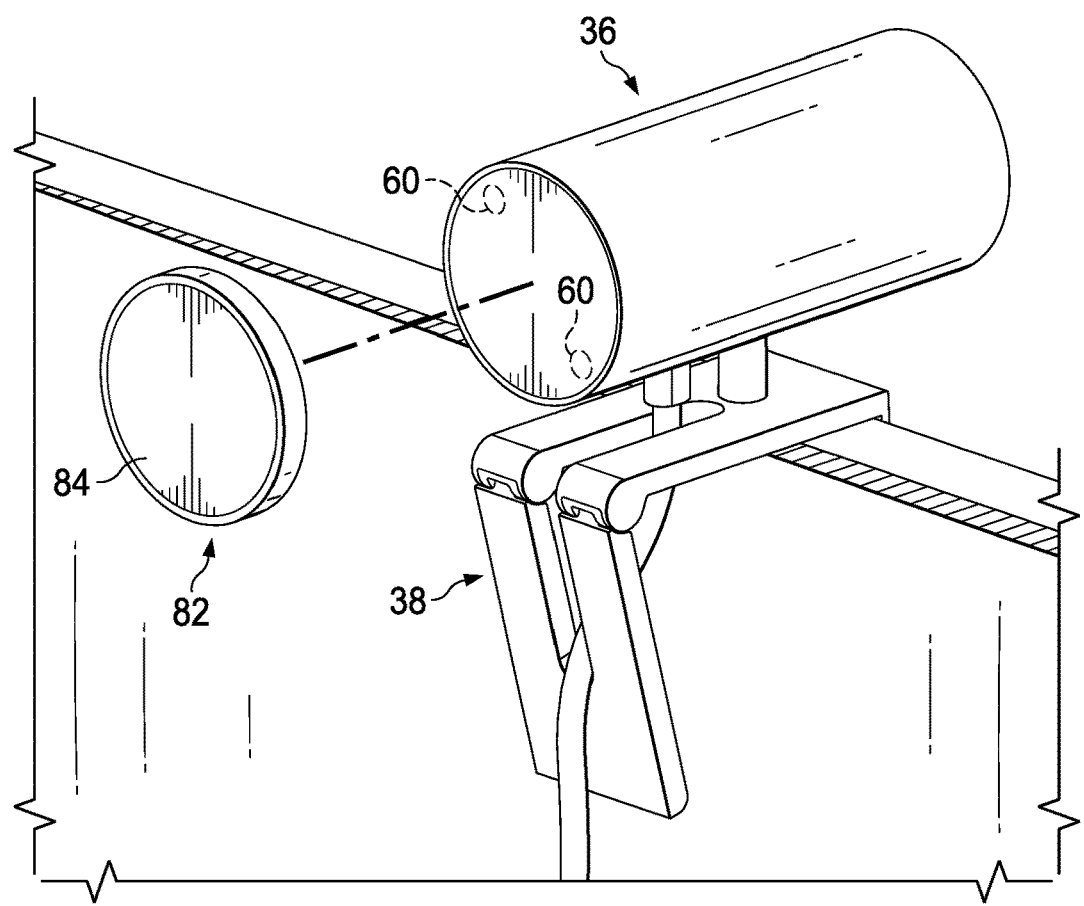

Referring now to FIGS. 6A and 6B, a lens cap 82 couples to a front face of camera 36 to protect lens cover glass 54 and to the rear face 56 of camera 36 for storage when camera 36 is in use. In the example embodiment, lens cap magnets 58 are hidden behind lens cover glass 54 to attract a ferromagnetic plate 84 integrated in lens cap 82 so that lens cap 82 is held firmly in place over the front face of camera 36 when not in use. For instance, a raised edge of the outer circumference of lens cap 82 engages in a slight indentation formed around the circumference so that the central region of lens cap 82 is held in place with spacing from the central region of lens cover glass 54. As illustrated by FIG. 6B, when lens cap 82 is removed from the front face of camera 36, it may be stored at the rear face by magnetic attraction of lens cap storage magnets 60 to ferromagnetic plate 84. In an alternative embodiment, magnets may be placed in lens cap 82 to attract to ferromagnetic material in camera 36. Alternatively, magnets having opposing poles may be used in both camera 36 and lens cap 82.

Figure 7A:
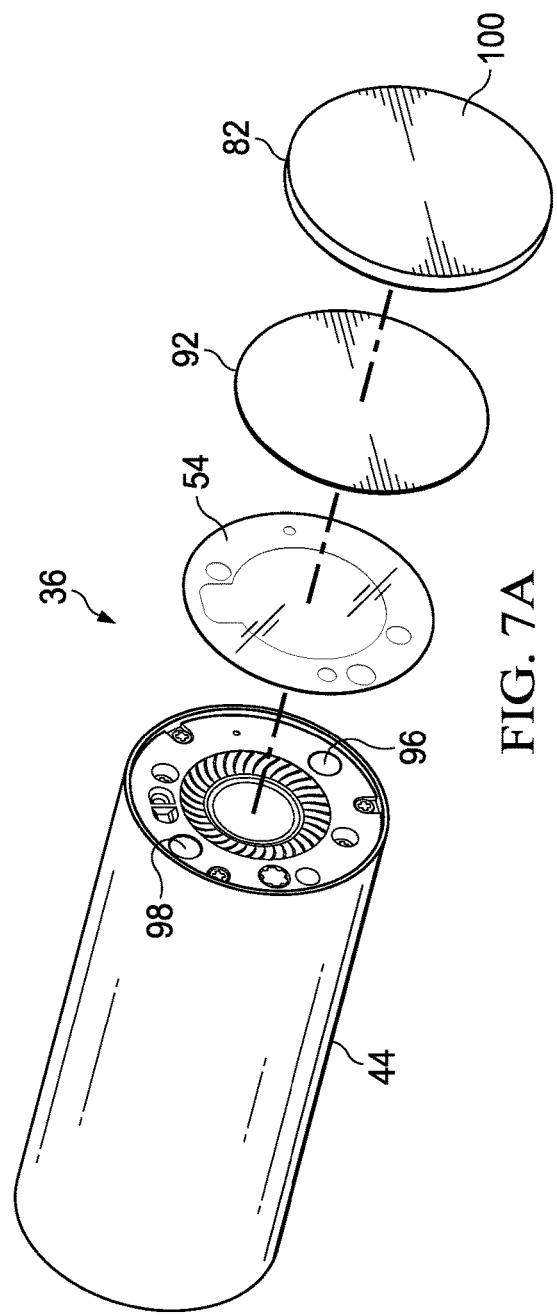
FIGS. 7A and 7B depict an exploded view of a camera having magnetic attachment of a lens cap with a defined orientation.
Figure 7B:
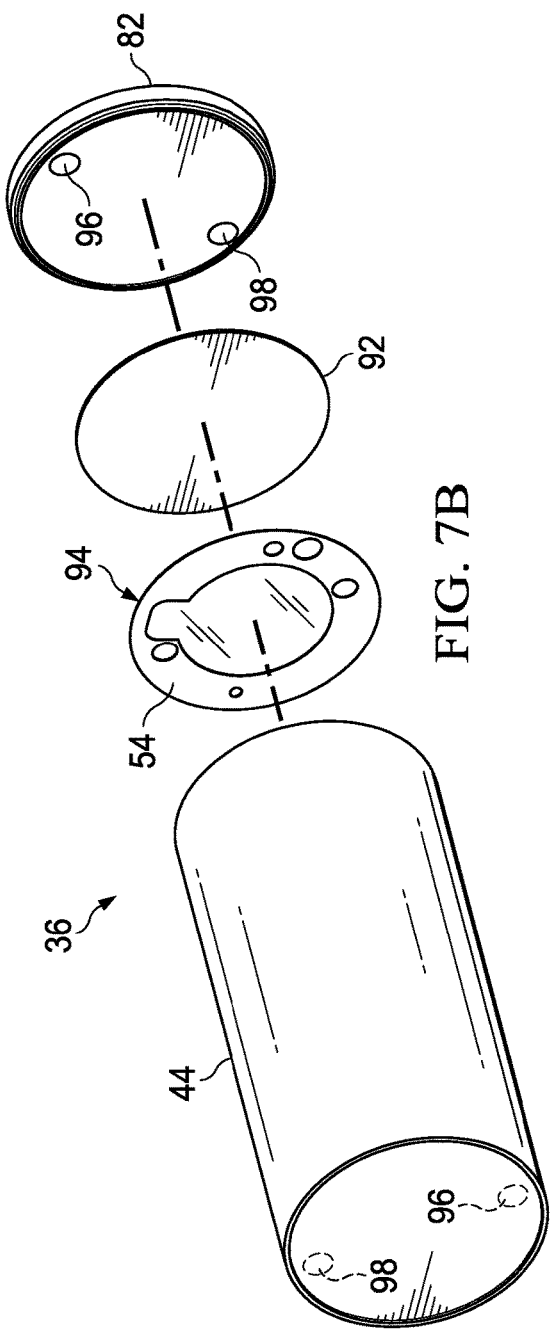

Referring now to FIGS. 7A and 7B, an exploded view depicts a camera 36 having magnetic attachment of a lens cap 82 with a defined orientation. FIG. 7A depicts a front perspective view of camera 36 having lens cover glass 54 exploded away from the front face. FIG. 7B depicts a rear perspective view of camera 36 having lens cover glass 54 exploded away. In the example embodiment, the inner side of lens cover glass 54 has a black printed image 94 that hides features at the front face of camera 36 around the front face perimeter. A north polarity magnet 96 couples to camera 36 behind black printed image 94 at one side of the front face, and south polarity magnet 98 couples to camera 36 behind black printed image 94 at an opposing side of the front face. Lens cap 82 includes a north polarity magnet 96 at one side and a south polarity magnet 98 at the opposing side. The magnets integrated in lens cap 82 are covered by a rubber sheet 92 to protect from impact against lens cover glass 54. At the front side of lens cap 82, a product logo 100 of "DELL" is spelled out to have an upright orientation when lens cap 82 couples to the front face of camera 36. The upright orientation of product logo 100 is provided by attraction of north polarity magnets 96 to south polarity magnets 98 when lens cap 82 is placed at the front face of camera 36. Incorrect orientation of product logo 100 is avoided by rejection of like magnet polarities if an attempt is made to place lens cap 82 on camera 36 with an incorrect orientation. In the example embodiment, a north polarity magnet 96 and south polarity magnet 98 are coupled at opposing sides of the rear face of camera 36 so that lens cap 82 may also be stored with product logo 100 in an upright orientation. Alternatively, a ferromagnetic plate may be placed at the rear face of camera 36 if logo orientation during lens cap storage is deemed less essential.

Figure 8:
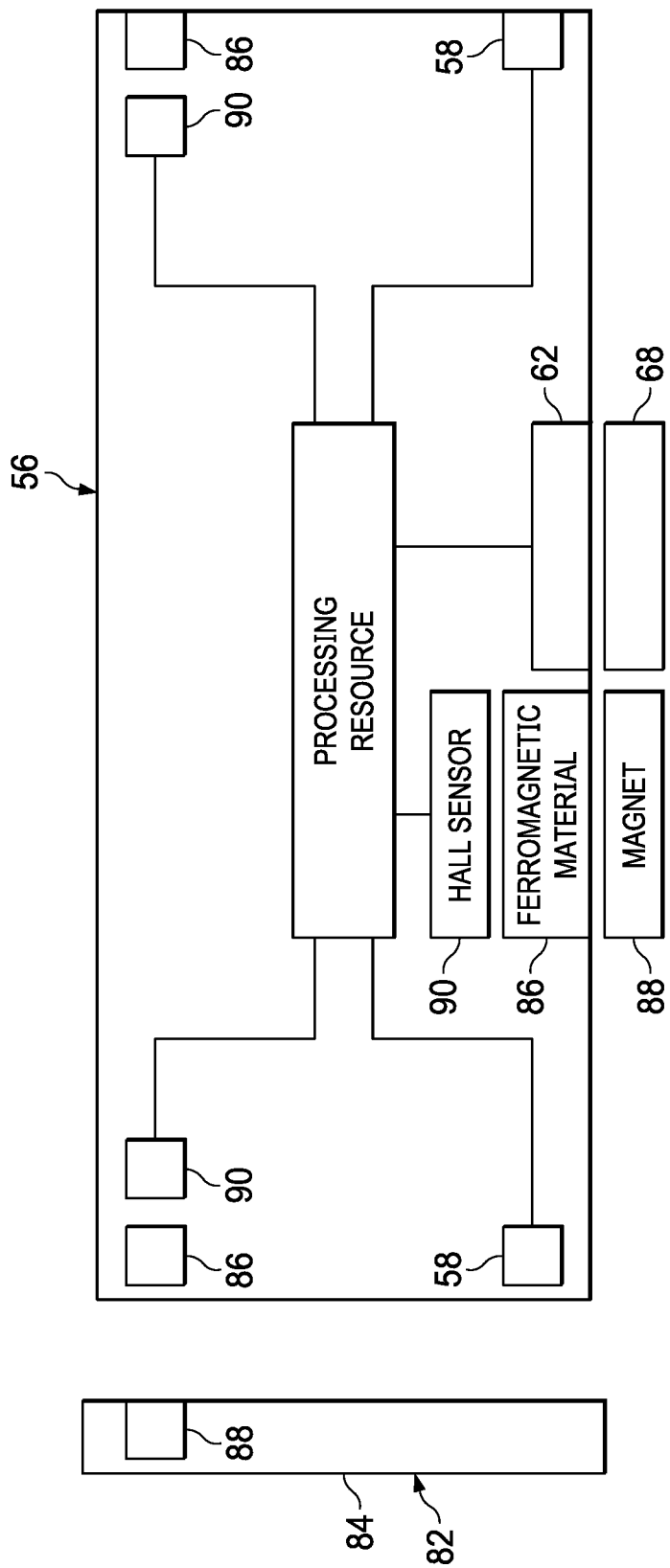
FIG. 8 depicts a block diagram of an alternative camera embodiment using electropermanent magnets to manage magnetic attraction of a stand member and lens cap.

Referring now to FIG. 8, a block diagram depicts an alternative camera embodiment using electropermanent magnets to manage magnetic attraction of a stand member and lens cap. An electropermanent magnet has a low magnetic attraction state and a high magnetic attraction state that is selected by applying a current to coil around a first magnet to change the pole orientation relative to a second proximate magnet. The low magnetic attraction state may be substantially an off state or may have a low level of magnetic attraction. In the example embodiment, processing resource 50 interfaces with stand member magnet 62, lens cap storage magnet 60 and lens cap magnet 58 to selectively apply current that changes the magnetic attraction of these magnets between high and low states. A ferromagnetic material, such as steel, is disposed proximate to stand magnet 62 and in camera 36 on an opposing side relative to lens cap magnet 58 and lens cap storage magnet 60. A small permanent magnet 88 is disposed in the stand member and in lens cap 82. The permanent magnets 88 and ferromagnetic material 86 provide an initial magnetic attraction to gently guide lens cap 82 in place at the front and rear faces of the camera and to guide the stand member into place in the bottom opening. Once lens cap 82 and the stand member are in place, flipping the electropermanent magnets to a high magnetic attraction provides a secure coupling with strong magnetic attraction. When an end user decides to remove lens cap 82 or the stand member, flipping the electropermanent magnet to a low magnetic attraction state aids in decoupling.

In the example embodiment, a sensor 90 disposed near ferromagnetic material 86 of the stand member, rear face and front face detects proximity of the permanent magnet 88 to report the proximity to processing resource 50. For example, sensor 90 is a Hall sensor or a magnetic switch. In one example embodiment, processing resource 50 applies detection of magnet proximity to switch the electropermanent magnet from a low to a high magnetic attraction. For example, attraction of the permanent magnet 88 to ferromagnetic material 86 of lens cap 82 indicates placement of the lens cap on the front face of the camera. By switching the electropermanent magnet to high magnetic attraction after placement of the lens cap, such as with a one second delay, a secure magnetic coupling of lens cap 82 is accomplished without an undue slapping force because the higher magnetic state is not turned on until lens cap 82 is in proximity. A similar controlled magnetic coupling is accomplished at the stand member.

Sensing of magnet proximity may also help with camera security and with removal of lens cap 82 when an end user is preparing the camera for use. For instance, while sensor 90 senses that lens cap 82 covers the camera lens, the camera may disable image capture for improved security. When the lens cap is removed, the user may receive a displayed message regarding camera security as the camera is placed to an on state. Alternatively, when lens cap 82 is in place and an end user powers the camera on, the electropermanent magnet may be flipped to a low magnetic state so that the end user can remove the lens cap with less forces, thereby avoiding prying that might damage the camera. An end user may be given an option to control the electropermanent magnet state from a camera user interface, such as by selection of a disassembly state that puts the stand member electropermanent magnet in a low magnetic state. In one embodiment, the camera may flip all electropermanent magnets to a high state as part of a power down. Alternatively, sensor 90 may include a magnetic switch that temporarily applies power when a proximate magnet is detected so that a high magnetic attraction state may be commanded.

Figure 9A:
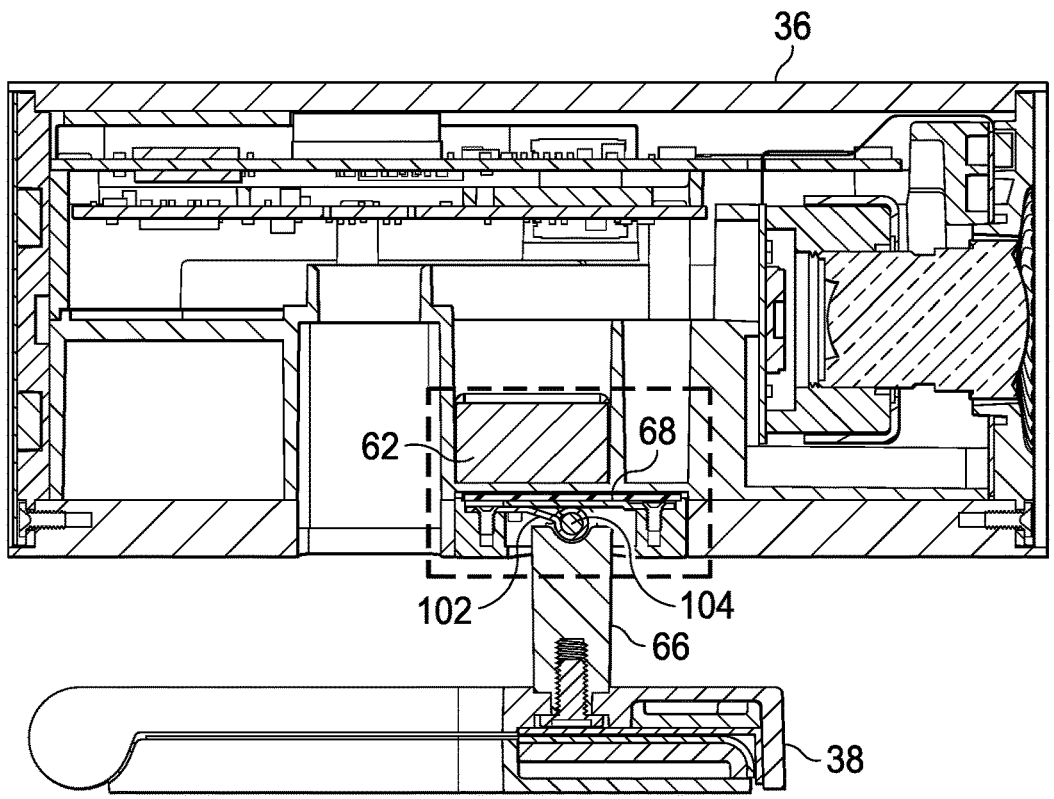
FIGS. 9A and 9B depict a side cutaway view of a bracket coupled to the camera and integrating a tilt hinge.
Figure 9B:
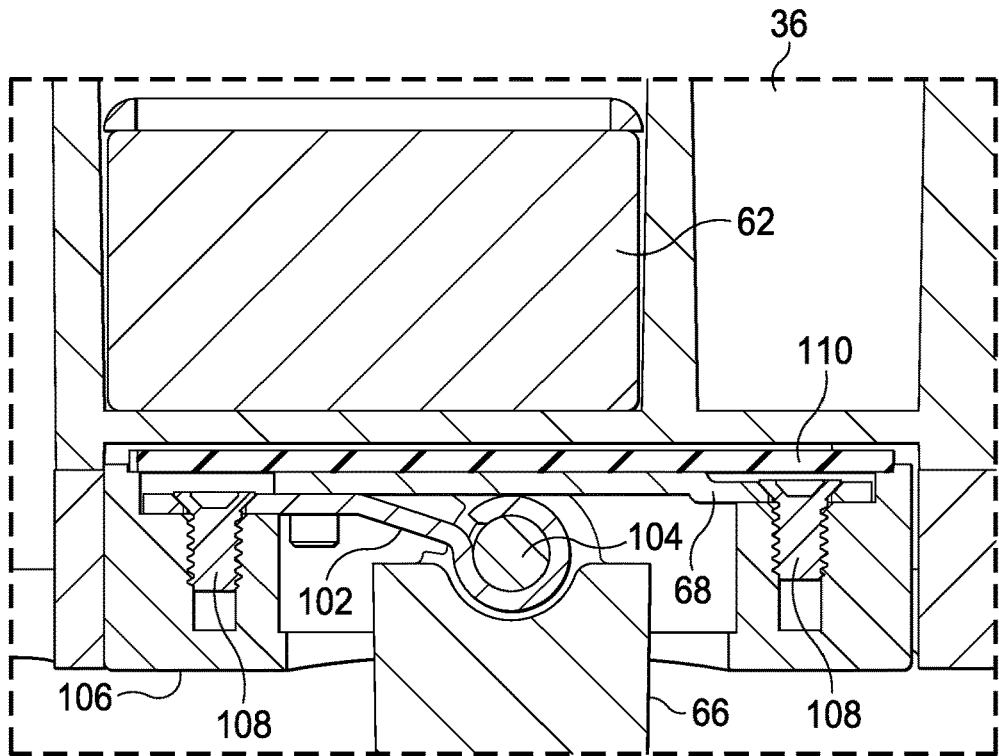

Referring now to FIGS. 9A and 9B, a side cutaway view depicts a bracket 38 coupled to camera 36 and integrating a tilt hinge 102. As described above, FIG. 9A depicts stand member 66 coupled to a ferromagnetic material 68, such as a steel plate, that couples to camera 36 with magnetic attraction. FIG. 9B depicts insertion of stand member 66 into an opening at the bottom of camera 36 with greater detail. Ferromagnetic material 68 is coupled by screws 108 to a rectangular adapter 106 and has a cushion 110 disposed over its upper surface. Adapter 106 is a machined rectangular block that provides three axis controller insertion to fit in the opening at the bottom surface of camera 36. The rectangular block shape of adapter 106 provides volumetric space to house a tilt hinge 102 that rotates about an axis 104 and couples to ferromagnetic material 68 at one of the screws 108. A tight coupling of tilt hinge 102 at axis 104 provides friction that resists undesired movement and maintain camera tilt at a set orientation once selected by an end user's input with sufficient force to overcome the resistance to rotation. The magnet embedded in the camera opening and magnetically coupled to the steel plate allows an end use to quickly swap the camera between different brackets and stands without any tools or moving the bracket. The end user lifts up on the camera to separate the stand member and places the camera on a different stand member having a ferromagnetic material to magnetically couple with the magnet in the camera opening. A threaded coupling of stand member 66 to bracket 38 allows retrofit of brackets and stands to have a universal coupling with camera 36. A tight fit of stand member 66 into the camera 36 provides stability to help prevent camera 36 from dislodging during tilt about tilt hinge 102.

Figure 10A:
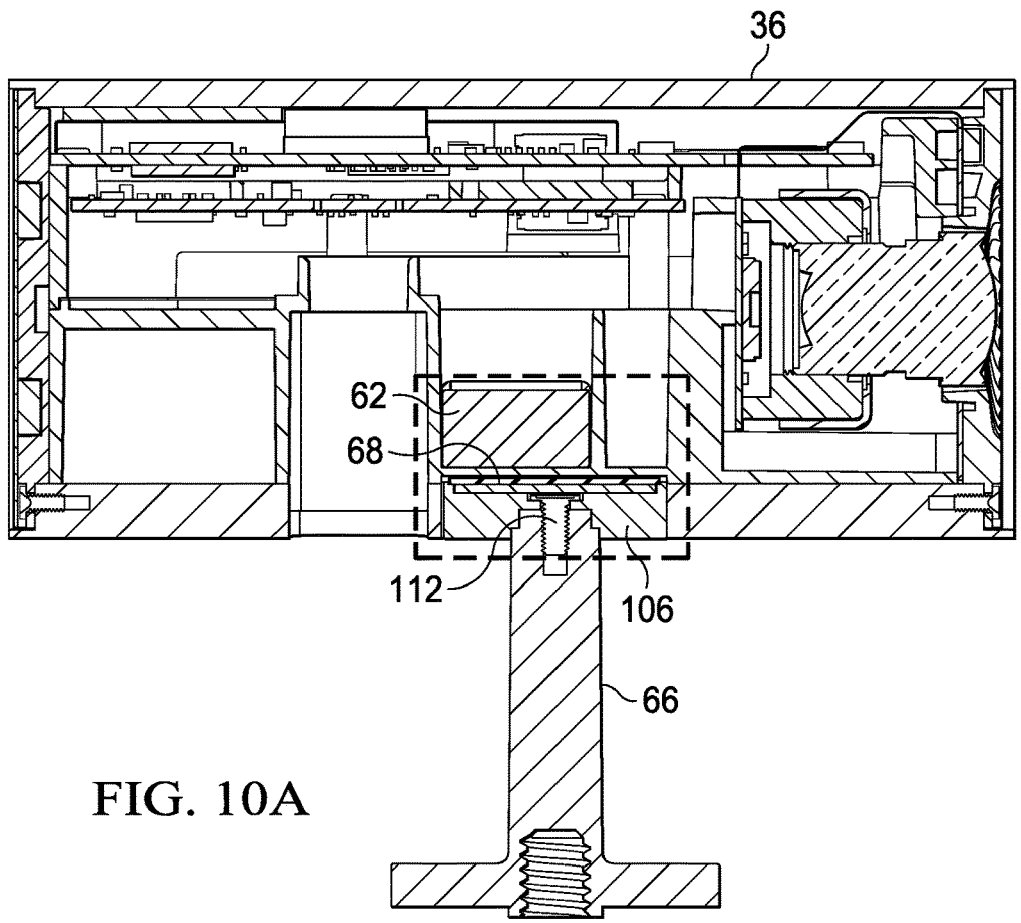
FIGS. 10A and 10B depict a side cutaway view of a tripod stand member having fixed tilt orientation.
Figure 10B:
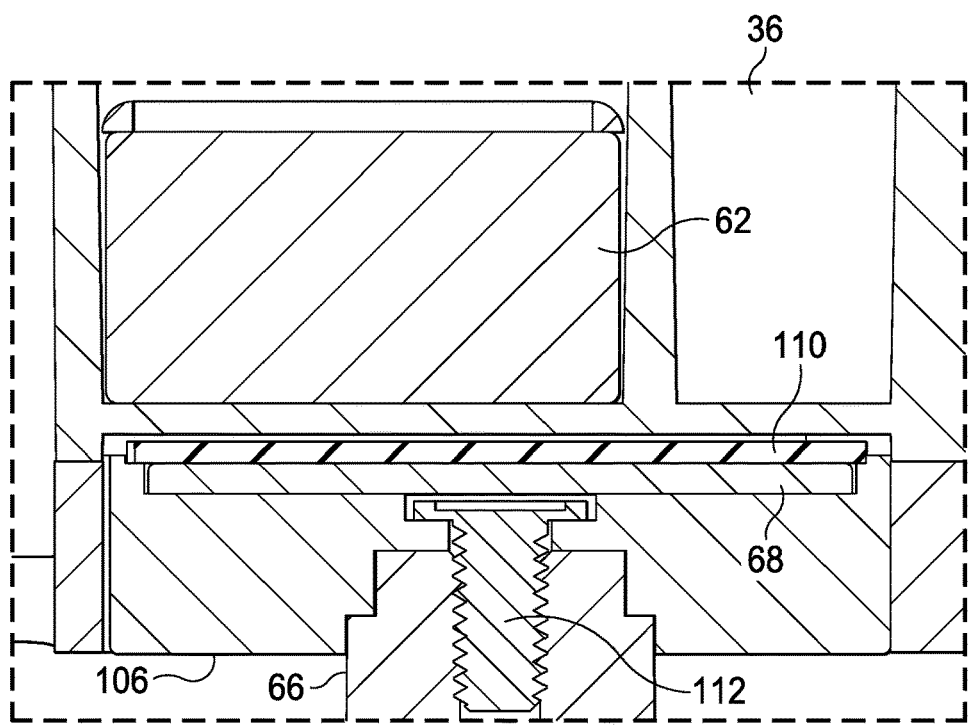

Referring now to FIGS. 10A and 10B, a side cutaway view depicts a tripod stand member 66 having fixed tilt orientation. In situations where a tripod is used to hold camera 36, the tripod height adjusts so that tilt can enter an unnecessary variable at camera setup. The example embodiment of FIG. 10A has a fixed mount 112 that secures ferromagnetic material 68 to adapter 106 with a bolt that passes through the steel plate of ferromagnetic material 68 and engages stand member 66. FIG. 10B depicts the insertion of stand member 66 into camera 36 with greater detail. A tight fit of the rectangular adapter 106 into the opening of camera 36 limits undesired movement of camera 36 relative to stand 66. A rubber cushion 110 helps to dampen any inadvertent vertical movement. The fixed coupling provides a secure viewing orientation of camera 36 on a tripod that has vertical adjustments of camera height. Camera 36 readily decouples from the fixed tripod stand to recouple to the bracket tilt-enabled stand to support rapid changes of position of the camera without tools or extended efforts threading and tightening bolts to nuts to obtain secure attachment.

Referring now to FIGS. 11A, 11B, 11C, 11D, 11E and 11F, assembly is depicted of an example stand member that integrates a tilt hinge is depicted. FIG. 11A depicts an example of a steel plate manipulated to form tilt hinge 102. A flat surface area 114 provides a solid coupling surface against ferromagnetic material 68, such as a steel plate, when coupled at the upper surface of tilt hinge 102. A curved region 116 vertically offsets from flat surface area 114 from an axis region 118 where steel plate is bent to form an opening to accept a pin. FIG. 11B depicts tilt hinge 102 having axis region 118 aligned with pivot supports 120 of stand member 66 to accept insertion of a pin that rotationally couples tilt hinge 102 to stand member 66. FIG. 11C depicts axle 104 inserted at a pivot support 120 through axis region 118 to define a rotational axis of tilt hinge 102. Axle 104 is a pin having a circular central region and a slotted tip to hold axle 104 still relative to stand member 66 when tilt hinge 102 rotates relative to stand member 66. Axis region 118 contacts against the circular region of axle 104 to generate friction that resists rotation of tilt hinge 102, such as will maintain a desired tilt angle when selected by an end user with rotation by the end user of tilt hinge 102 through application of force that overcomes the friction. In various embodiments, additional friction generating devices may be used.

FIG. 11D depicts an example of coupling of tilt hinge 102 to ferromagnetic material 68 and stand member 66. Ferromagnetic material 68 is a steel plate having rivets 122 inserted to couple to openings of tilt hinge 102. Openings at opposing sides of the steel plate accept screws to couple to an adapter, as shown in FIG. 11E. Adapter 106 is an anodized aluminum block machined to have a precise fit into the camera stand bottom opening and a central open area to accept ferromagnetic material 68. Stand member 66 inserts from above into a central opening of adapter 106 with tilt hinge 102 coupled through pivots 120 by axle 104 and ferromagnetic material 68 coupled by rivets 122. Screws 108 insert at opposing ends of ferromagnetic material 68 to engage threads formed in adapter 106. In the example embodiment, one screw 108 directly couples tilt hinge 102 to adapter 106 and the opposing screw directly couples ferromagnetic material 68 to adapter 106. Adapter 106 may then rotate relative to stand member 66 about the axle 104 and pivot supports 120. FIG. 11F depicts the assembled stand member 66 and adapter 106 with a rubber cushion 110 disposed over ferromagnetic material 68. Threads formed at the base of stand member 66 engage in the bracket for a secure coupling. Stand member 66 then couples and decouples at the camera with magnetic attraction.

Although the present invention has been described in detail, it should be understood that various changes, substitutions and alterations can be made hereto without departing from the spirit and scope of the invention as defined by the appended claims.

What is claimed is:

1. An information handling system comprising:
a housing;
a processor disposed in the housing and operable to execute instructions that process information;
a memory disposed in the housing and operable to store the instructions and information;
a communication port disposed in the housing and interfaced with the processor to communicate with peripheral devices through a cable;
a display interfaced with the processor and operable to present the information as visual images; and
a peripheral camera interfaced with the processor through the port, the peripheral camera having cylindrical housing, a lens at a front of the cylindrical housing, a communication port disposed within a first opening formed at the bottom of the cylindrical housing to interface with the cable, a magnet disposed in a second opening formed at the bottom of the cylindrical housing, and a stand having a member sized to fit into the second opening, the member integrating a ferromagnetic material to couple the stand to the camera housing by magnetic force;
a sensor disposed at the rear of the cylindrical housing; and
a power switch interfaced with the sensor and configured to apply power to the camera when a lens cover couples to the rear of the cylindrical housing.

2. The information handling system of claim 1 wherein the stand further comprises:
a first bracket portion coupled to the stand member;
a second bracket member;

a hinge rotationally coupling the first and second bracket members; and a biasing device integrated with the hinge to bias the second bracket member towards a planar orientation relative to the first bracket member;

wherein the first bracket member rests on an upper surface of the display and the second bracket member biases against a rear surface of the display to couple the camera housing to the display.

3. The information handling system of claim 2 wherein the first bracket member has a lip at an end opposite the hinge and the second bracket member has a length of less than the first bracket member so that the second bracket member closes flat against the first bracket member and bottom of the lip.

4. The information handling system of claim 1 wherein the stand further comprises a tripod coupled to the stand member.

5. The information handling system of claim 1 further comprising:
 a processing resource integrated the camera housing;
 wherein the magnet further comprises an electropermanent magnet interfaced with the processing resource, the processing resource selectively adjusting a magnet state of the electropermanent magnet between a high magnet state and a low magnet state based upon one or more predetermined conditions.

6. The information handling system of claim 1 further comprising:
 a lens cover sized to fit over the lens;
 a ferromagnetic plate integrated in the lens cover; and
 a magnet disposed proximate the lens and aligned to attract the lens cover over the lens.

7. The information handling system of claim 6 further comprising a magnet integrated in a rear of the camera housing and aligned to attract the lens when removed from the lens.

8. The information handling system of claim 6 further comprising:
 a sensor disposed at the front of the camera housing; and
 a power switch interfaced with the sensor and configured to apply power to the camera when the lens cover is absent and remove power when the lens cover is present.

9. A method for coupling a camera to a bracket having first and second portions rotationally coupled by a hinge, the method comprising:
 integrating a camera into a cylindrical housing;
 integrating a magnet into an opening on a bottom of the cylindrical housing;
 integrating a ferromagnetic material in a member extending from the bracket;
 inserting the member into the opening to magnetically attract the support to the camera housing;
 coupling a cable to a cable port located at the bottom of the cylindrical housing; and
 routing the cable through a first slot formed in the first portion and a second slot formed in the second portion to an information handling system, the first and second slots aligned with a space separating the hinge into first and second sides.

10. The method of claim 9 further comprising:
 compressing the first and second portions to a planar configuration about the hinge biased to rotate closed; and placing a lip of the first portion over a front edge of a display; and compressing the lip against the front edge of the display by placing the second portion against a rear side of the display.

11. The method of claim 9 further comprising:
coupling the support to a tripod; and
placing the tripod in front of a display that presents visual images of a videoconference associated with the camera.

12. The method of claim 9 wherein the magnet comprises an electropermanent magnet, the method further comprising:
 commanding a first magnetic state of the electropermanent magnet to couple the member to the camera; and
 commanding a second magnetic state of the electropermanent magnet to release the member from the camera.

13. The method of claim 9 further comprising:
 integrating a first magnet having a first polarity into the camera at a front face;
 integrating a second magnet having a second polarity opposite the first polarity into a lens cap; and
 coupling the lens cap to the front face with magnetic attraction of the first and second magnets.

14. The method of claim 13 further comprising:
 integrating a logo having an orientation in a front face of the lens cap; and
 providing an upright orientation of the logo relative to the camera by the relative orientation of the first and second magnets in the camera and lens cap.

15. A camera comprising:
cylindrical housing;
a lens at a front of the cylindrical housing;
a communication port disposed within a first opening formed at the bottom of the cylindrical housing to interface with a communications cable;
a magnet disposed in a second opening formed at the bottom of the cylindrical housing;
a stand having a member sized to fit into the second opening, the member integrating a ferromagnetic plate to couple the stand to the camera housing by magnetic force;
a lens cap sized to fit over the front of the cylindrical housing;
a magnet integrated in the lens cap; and
a Hall sensor integrated in the camera;
wherein the camera powers down when the Hall sensor senses the magnet.

16. The camera of claim 15 further comprising:
a first bracket portion coupled to the stand member;
a second bracket member;
a hinge rotationally coupling the first and second bracket members; and
a biasing device integrated with the hinge to bias the second bracket member towards a planar orientation relative to the first bracket member;
wherein the first bracket member rests on an upper surface of display and the second bracket member biases against a rear surface of the display to couple the camera housing to the display.

17. The camera of claim 15 wherein the stand further comprises a tripod coupled to the stand member.

* * * * *